United States Patent [19]

Good et al.

[11] Patent Number: 5,731,374
[45] Date of Patent: Mar. 24, 1998

[54] SOLVENT-BASED, THERMAL PAINT

[75] Inventors: John W. Good, Liverpool; Rufus H. Kerry, Syracuse, both of N.Y.

[73] Assignee: P.S.A.M.S., Inc., Inverness, Fla.

[21] Appl. No.: 223,113

[22] Filed: Apr. 5, 1994

[51] Int. Cl.⁶ .................................................. G08K 3/34
[52] U.S. Cl. .......................... 524/444; 524/261; 524/424; 524/435; 524/445; 524/446; 524/765; 524/858; 525/445; 525/446; 428/402; 428/446; 428/450
[58] Field of Search .................................. 524/444, 261, 524/558, 424, 435, 765, 858; 525/445, 446; 428/402, 446, 450

[56] References Cited

U.S. PATENT DOCUMENTS

| | | | |
|---|---|---|---|
| 4,074,010 | 2/1978 | Knight | 428/422 |
| 4,155,887 | 5/1979 | Hetson | 524/27 |
| 4,719,251 | 1/1988 | Dietlein et al. | 523/218 |
| 4,761,310 | 8/1988 | Boaz | 427/314 |
| 5,090,983 | 2/1992 | Boaz | 65/25.4 |
| 5,154,768 | 10/1992 | Yamada et al. | 106/450 |

*Primary Examiner*—Vasu Jagannathan
*Assistant Examiner*—John J. Guarriello
*Attorney, Agent, or Firm*—Shook, Hardy & Bacon L.L.P.

[57] ABSTRACT

An organic solvent-based paint is provided which has, among other things, a perlitic component. The paint resists thermal loading and loss. A series addition of components provides the paint efficiently. The paint is useful for many substrates, including metals.

9 Claims, No Drawings

SOLVENT-BASED, THERMAL PAINT

FIELD OF THE INVENTION

The present invention concerns an organic solvent-based, thermal paint, which may be considered to contain a ceramic or an inorganic insulative component, and making and using the paint.

BACKGROUND TO THE INVENTION

Various paints are known, some of which are ceramic.

For example, Knight, U.S. Pat. No. 4,074,010, discloses ceramic-paint coatings, which are multi-layered in nature. Such coatings are made by applying finely-divided material such as 100-micron silica to ceramic paint while it is still wet, curing without fusing the paint, and then applying another coat of ceramic paint.

Boaz, U.S. Pat. Nos. 4,761,310 & 5,090,983, discloses a method of bonding an oil-based ceramic paint to a surface of a glass sheet, and a metal enriched scratch resistant ceramic paint, respectively. The latter paint applies to glass as well.

In buildings, particularly those which have a significant amount of exposed metal components, the phenomena of heat loading or loss such as caused by solar radiation or radiative heat loss can be problematical. For instance, metal roofs, to include those painted with conventional paints, can under the influence of solar radiation expand to the point where significant separation can occur from other structural components causing openings which allow water leaks, wind and wind-carried abrasive weathering, and even undesired animal entry, into the building. In general, a rapid gain or loss of heat, particularly from metal building components, which can expand or contract dramatically with the rapid gain or loss in heat, is undesirable. A more moderate gain or loss of heat might be acceptable, but one has little, if any, control of the elements, in particular in the environment where a building structure resides.

As well, metal, to include metal painted with conventional paint, is a notorious heat conductor, which allows for excessive heat loss from the building system on cold days, or excessive heat gain on hot days. Accordingly, it can become economically inefficient and environmentally undesirable to have a building which engenders such problems. Of course, metal is a valuable structural component of many buildings and ofttimes is nearly, if not wholly, indispensable in building construction. Thus, the problem becomes one of adapting to such employment of metal, and ameliorating or overcoming its drawbacks, in buildings.

As regards paint, in general, good adhesion, coverage and hiding are desired properties. In addition, the paint should be tough, resistant to scratching and weathering, and flexible.

SUMMARY OF THE INVENTION

It is an object of the present invention to provide an organic solvent-based, insulative paint.

It is a more particular object hereof to provide such a paint which provides an effective barrier to radiative heat gain or heat loss.

It is also an object of the invention to provide such a paint which can be effectively applied to building surfaces, to include those of metal.

It is another object of the invention to provide such a paint which has good adhesion.

It is yet another object of the invention to provide such a paint which has good coverage and hiding.

It is a further object of the invention to provide such a paint which is flexible, has toughness and resistance to scratching and weathering.

To accomplish these and other objects, the present invention provides, in one aspect, an organic solvent-based, insulative paint comprising a mixture which contains the following components:

A) A substantial amount of a silicone modified polyester type film forming agent;
B) A high refractive index pigment and an extender;
C) An amount of organic solvent containing an aromatic part and an aliphatic hydroxylated part, which is sufficient to assist in mixing the other components, to assist in keeping the paint in a state suitable for application, and to assist in providing a uniform, defect-free film.
D) A melamine/melamine-formaldehyde type cross-linker/leveling agent;
E) A perlitic insulative agent;
F) A catalytic organic acid;
G) A stabilizer of an amino alcohol; and
H) A defoaming agent.

In another aspect, a method of making said paint comprises serially carrying out the following steps:

A) Mixing together a minor amount of a silicone modified polyester type film forming agent and a high refractive index pigment to provide a first intermediate mixture;
B) Adding to the first intermediate mixture and mixing together a major amount of a silicone modified polyester type film forming agent and at least one melamine/melamine-formaldehyde type cross-linker/leveling agent to provide a second intermediate mixture;
C) Adding to the second intermediate mixture and mixing an extender to provide a third intermediate mixture;
D) Adding to the third intermediate mixture a major amount of organic solvent containing an aromatic part and an organic hydroxylated part to provide a fourth intermediate mixture;
E) Adding to the fourth intermediate mixture with mixing a separate, pre-mixed mixture of a minor amount of organic solvent containing an organic hydroxylated part, catalytic organic acid and a stabilizer of an amino alcohol to provide a fifth intermediate mixture;
F) Adding to the fifth intermediate mixture and mixing a defoamer to provide a sixth intermediate mixture;
G) Adding to the sixth intermediate mixture with further mixing to at least substantial uniformity a perlitic insulative agent to provide a seventh intermediate mixture, and
H) Adding to the seventh intermediate mixture a minor amount of organic solvent containing an aromatic part, and mixing to provide said paint.

The paint of the invention is useful in protecting buildings and other structures, particularly components thereof which are made of metal to include steels and so forth, and the applied paint and substrate composition is a further aspect of the present invention. Significantly, the paint of the invention provides not only good heat insulation, but also good adhesion especially to metals, coverage, hiding, toughness and resistance to scratching and weathering, and flexibility. The method quite surprisingly affords a desirable paint mixture, and its steps when taken out of turn do not afford such a desirable paint. The present invention can ameliorate or solve problems in the art, to include as aforesaid, and it fulfills objects of the invention.

Numerous further advantages attend the invention.

ILLUSTRATIVE EMBODIMENTS OF THE INVENTION

The aforementioned Knight and Boaz patents are incorporated herein by reference.

The paint hereof is a solvent-based, insulative formulation. The terms "solvent" or "organic solvent" employed herein, and in conjunction with the term "based," are intended to mean an organic compound which functions as a diluent, or an active or latent solvent for the other components hereof, as part of the vehicle hereof, as appropriate.

The paint hereof contains a substantial amount of a silicone modified polyester, or the like, i.e., type, component, present in any suitable amount. This component is a copolymer and functions as a film forming agent. Typically, the silicone modified polyester has a backbone of a polyester polymer formed from condensation of dibasic acid and polyhydric alcohol to form the polymer. The silicone modification is typically by incorporation of organofunctional silicone or sylyl moieties onto the polyester backbone. For example, the silicone modified polyester type film former may be a condensation polymer of neopentyl glycol. It is often provided in an organic solvent based media, wherein the polymer makes up for about from 50 to 70 percent of the weight of the media. Typically, this film forming agent makes up the largest part of the paint.

The paint hereof contains a high refractive index pigment and an extender, present in any suitable amount. The pigment may be any suitable pigment having a high refractive index, to include white, black and/or colored pigments. The refractive index of the pigment is generally above 1.5. Organic pigments such as lampblack, phthalocyanine blue or Hansa yellows, and so forth and inorganic pigments such as white lead carbonate or sulfate zinc oxide (which may function as a mild mildewicide as well), iron oxide, chromium oxide, titanium dioxide, and so forth, may be employed. Preferably, the pigment has an index of refraction of about 2.5 or greater and is considerably light reflective. For example, the high refractive index pigment can be or contain titanium dioxide, typically of the rutile form (nonchalking with index of refraction 2.7), and of a general particle size about from 0.2 to 0.3 or so microns in diameter. In practice, the titanium dioxide is about 0.28 microns in diameter with some variation in particle size. The extender, which may be also known as a filler can be any suitable material, to include one or more inorganic extenders such as silicates to include talc (magnesium silica), silica, clay, mica, and so forth and the like. Preferably, the extender is composed of a filler such as, for example, amorphous silica (synthetic). The size of extender particles may vary with the application, and may be found within particles of a size about from 3 microns to 5 microns in diameter. Typically, the high refractive index pigment is present in a major amount in comparison to the extender, which is thus present in a minor amount in comparison to the pigment, and together, the pigment and extender make up a substantial part of the paint, often only second in amount to the film forming agent.

The paint hereof contains an amount of organic solvent containing aromatic part and aliphatic hydroxylated parts, present in any suitable amount. The amount of solvent is sufficient to assist in mixing the other components, to assist in keeping the paint in a state suitable for application, and to assist in providing a uniform, defect-free film. The aromatic part may be composed of or contain such aromatic compounds as of mixtures of alkylated benzenes such as toluene, xylenes, phenylethanes, phenylpropanes to include cumenes, mixtures of methyl, ethyl, propyl, butyl benzenes, alkylated naphthalenes, and so forth and the like. It may contain indans, indenes, tetrolines, and so forth and the like. Preferably, the aromatic part is composed of a composition such as, for example, a mixture of aromatics, especially of or predominately of hydrocarbons, especially having an aromatic content by volume of at least about 95 and preferably at least about 99 percent, such as obtainable from distillation of coal tar, say, having a boiling point (b.p.) about from 150 to 250 degrees C. The aliphatic hydroxylated part may be composed of or contain such types of compounds as aliphatic alcohols and ether-alcohols, preferably which are alkyl in nature. As examples of the alcohols may be mentioned lower alkyl mono hydroxy alcohols such as methanol, ethanol, propanols, butanols pentanols, hexanols, and so forth. As examples of the ether alcohols may be mentioned glycol mono alkyl etherates such as ethylene glycol monoethyl ether (2-ethoxyethanol), ethylene glycol monopropyl ether (2-propoxyethanol), ethylene glycol monobutyl ether (2-butoxyethanol), ethylene glycol monohxyl ether (2-hexoxyethanol), 1,2-propylene glycol monomethyl ether (2-methoxypropan-1-ol), 1,2-propylene glycol monoethyl ether (2-ethoxypropan-1-ol), and so forth and the like. A mixture of the aliphatic alcohols and ether-alcohols is preferred. A preferred organic solvent mixture embraces an eight to twelve carbon containing mixture of aromatic hydrocarbons such as lower alkylated benzenes, naphthalenes, indanes, indenes, tetrolines and so forth and the like as the aromatic part, with 1-butanol and 2-butoxyethanol as the aliphatic alcohol part. Typically, the aromatic part makes up a larger portion of the solvent than the aliphatic hydroxylated part, and the solvent is added to make up a substantial part of the paint, often only second or even perhaps approximate in amount to the pigment and extender component.

The paint hereof contains a melamine/melamine-formaldehyde, or the like, i.e., type, cross-linker/leveling agent, present in any suitable amount. By the term "cross-linker/leveling agent" is meant a compound or composition which functions as either a cross-linking agent or a leveling agent, or both, in the paint hereof. Suitable melamine-formaldehydes include unalkylated and alkylated melamine-formaldehydes such as having about from one-carbon to six-carbon substituents for each melamine nucleus, which substituents may be single in nature or approach or even be per-substituted. Degrees of polymerization may range from about 1 to 30 or so. Preferably, a mixture of melamine-formaldehyde compositions is employed. For instance, a mixture of a lower alkyl substituted hexamethoxymelamine with a degree of polymerization of about from 1 to 3 and a three to five carbon alkylated melamine oligomer with a degree of polymerization of about from 5 to 15 or so may be employed. Typically, the cross-linker/leveling agent is present in a fairly small amount, and less in amount than the organic solvent.

The paint hereof contains a perlitic insulative agent, present in any suitable amount. This is preferably an expanded perlitic material. For example, the insulative agent can be expanded perlite. The insulative agent is a prime provider of thermal resistance in the paint of the invention. Preferably, it is uniformly distributed throughout the paint. Typically, the perlitic insulative agent makes up a surprisingly small amount of the paint to achieve its thermally resistant effect, often approximately about or even less in amount than the cross-linker/leveling agent.

The paint hereof contains a catalytic organic acid, present in any suitable amount. The catalytic organic acid has a function of catalyzing cross linking, assisting curing and so forth, to form a desired film with the film forming agent, and so forth. Such acids are well known, an illustrative example of which is toluene sulfonic acid. Typically, the catalytic organic acid is present is a very small amount, less than the perlitic insulative component.

The paint hereof contains a stabilizer of an amino alcohol present in any suitable amount. As the stabilizer, there may be mentioned such compounds as amino alcohols, which are preferably substituted alkyl compounds. Examples include 2-aminoethanol, 2-aminopropan-1-ol, 2-amino-2-methylpropan-1-ol, 2-amino-2-methyl butan-1-ol, and so forth and the like. Typically the stabilizer is present is a very small amount, often in an amount even less than the catalytic organic acid.

The paint hereof contains a defoaming agent, of any suitable make-up and present in any suitable amount. The defoaming (antifoaming) agent reduces foaming of the paint, especially about its air-interface surface, which may unduly interfere with processing and/or application. Some examples of known defoaming agents are 2-octanol, sulfonated oils, organic phosphates, silicone fluids, dimethylpolysiloxane, polyethylene glycol mixed esters, polymeric alkoxylates of saturated or unsaturated carboxylic acids, semi-solid waxy metal carboxylates, metallic soaps of stearic acid, and reacted silicas. The defoaming agent may have no silica. Preferably, the defoaming agent is employed by addition in the final stages of manufacture of the paint. Typically, the defoaming agent makes up a small amount of the paint to be effective, often present in an amount approximately near to the amount of the aforesaid catalytic organic acid.

The following table illustrates some ranges that components of the paints may generally be found about, in parts by weight:

| Paint Component | General Range | Preferred Range |
| --- | --- | --- |
| Film forming agent | 40 to 60 | 45 to 55 |
| High refractive index pigment | 10 to 30 | 15 to 25 |
| Extender | 2 to 15 | 7 to 10 |
| Solvent | | |
| Aromatic | 5 to 20 | 7 to 12 |
| Aliphatic hydroxylated | 3 to 15 | 4 to 10 |
| Cross-linker/leveling agent | | |
| Cross-linker | 1 to 5 | 2 to 4 |
| Leveler and cross-linker | 0.2 to 3 | 0.4 to 1.4 |
| Perlitic insulative agent | 0.5 to 10 | 1 to 3 |
| Catalytic organic acid | 0.1 to 1 | 0.2 to 0.5 |
| Amino alcohol stabilizer | <0.1 to 0.5 | 0.1 to 0.3 |
| Defoaming agent | <0.1 to 0.5 | 0.1 to 0.3. |

Actual amounts may vary depending on various factors. Also, other substances may or may not be present as desired.

The paint hereof can be made by a method where at least the aforesummarized steps are carried out. The steps are conducted serially, i.e., one after another in the indicated series.

Typically, the method is a batch method. A suitable vessel with suitable agitation or stirring devices is employed.

To provide the first intermediate mixture, a minor amount of a silicone modified polyester type film forming agent and a high refractive index pigment are added, generally with mixing, and further mixed. Mixing may be at a suitable speed, for example, a high speed, with the grind of the mixture being checked as needed. Preferably, the Hegman grind of the first intermediate mixture is about from 6 to 8. The speed of the mixing should not be such that excessive air is introduced into the mixture.

To provide the second intermediate mixture, added to the first intermediate mixture with mixing are a major amount of a silicone modified polyester type film forming agent and at least one melamine/melamine-formaldehyde type cross-linker/leveling agent. Preferably, hexamethyoxymethylmelamine (CYMEL 303) is utilized.

To provide the third intermediate mixture, added to the second intermediate mixture with mixing is an extender. Preferably, amorphous silica (SILCRON G-640) is utilized.

To provide the fourth intermediate mixture, added to the third intermediate mixture a major amount of organic solvent containing an aromatic part and an organic hydroxylated part. Preferably, aromatic mainly hydrocarbon mix (AROMATIC #150) and 2-butoxyethanol (Butyl CELLOSOLVE) are utilized.

To provide the fifth intermediate mixture, added to the fourth intermediate mixture with mixing is a mixture of a minor amount of organic solvent containing an organic hydroxylated part, catalytic organic acid, and a stabilizer of an amino alcohol. The mixture is pre-mixed, separately, before the addition. Preferably, 1-butanol, toluene sulfonic acid (CATALYST 1010), and 2-amino-2-methyl-1-propanol (2 AMP REGULAR) are utilized.

To provide the sixth intermediate mixture, added to the fifth intermediate mixture and mixing is a defoamer. Preferably, a defoamer sold by Witco Chemical Co. under the brand name BALAB 760 is utilized.

To provide the seventh intermediate mixture, added to the sixth intermediate mixture with further mixing to at least substantial uniformity a perlitic insulative agent. Preferably, 1–210 micron-sized expanded perlite (CERAMIC SIL 42-18) is used.

To provide the paint hereof, added to the seventh intermediate mixture is a minor amount of organic solvent containing an aromatic part. Final mixing, often for a fairly short time, to desired consistency is then typically carried out.

The prepared paint formulation is then typically tested for quality, and drawn for distribution and use.

Following the method of the invention, a desirable paint mixture is thus afforded. However, when steps of the method are taken out of turn, desirable results typically do not obtain.

The paint is preferably applied by roll coating but can also be applied by brushing, rolling, sponging, spraying, and so forth, to a suitable substrate.

The paint of the invention is useful in coating and protecting buildings, other structures, and components thereof, particularly those which are made of metal, to include roofs, window frames, door frames, other wall panels or beams, exteriors of boilers, storage tanks for water or fuel, ships, and so forth. The paint is preferably applied to the metal in a roll coating process and the metal is then used in the erection or construction of the structures. Alternatively, the paint may be applied to the structure following erection. Steel is an advantageous substrate. A primer or undercoat may be applied to the substrate initially.

Of great significance, the paint hereof, with its perlitic component, provides good heat insulation, as from protection from solar radiation or radiative heat loss, which is significantly better than conventional paints. It also can provide good adhesion, especially to metals, good coverage, hiding, toughness and resistance to scratching and weathering, and flexibility.

The following example further illustrates the invention, with parts and percentages indicated by weight.

EXAMPLE

Component items to make-up a paint of the invention are provided as follows:

| Item | Percent | Material and Function |
|---|---|---|
| 1 | 12.46 | POLYMAC 919 (Supplier: McWhorter Inc.) silicone modified polyester condensation polymer of neopentylglycol film former |
| 2 | 18.74 | Titanium dioxide CR-822 (Supplier: Kerr McGee Chemical Corp.) 0.22 micron-size pigment |
| 3 | 38.31 | POLYMAC 919 (as above) |
| 4 | 2.88 | CYMEL 303 (Cytec Industries Inc.) hexamethoxymethylmelamine (degree of polymerization about (ca.) 1.7) cross linker |
| 5 | 0.83 | CYMEL 247-10 (Cytec Industries Inc.) butlyated melamine (60% in diluent, degree of polymerization ca. 8–12) leveling agent and cross linker |
| 6 | 8.46 | SILCRON G-640 (SCM Corp.) 4 micron-size amorphous silica extender including for gloss control |
| 7 | 7.00 | AROMATIC #150 (Exxon Chemical Americas) aromatic mainly hydrocarbon mix (b.p. ca. 185–204 degrees C.; including methyl, ethyl and propyl substituted benzenes and naphthalenes, indanes, indenes and tetrolines, mainly benzenes, ca. 9% naphthalenes; mainly 10-carbon aromatics, ca. 6% 9-carbon aromatics, ca. 20% 11-carbon aromatics) solvent |
| 8 | 5.16 | Butyl CELLOSOLVE (Union Carbide Corp.) 2-butoxyethanol solvent |
| 9 | 1.24 | 1-butanol (Supplier: Union Carbide Corp.) solvent |
| 10 | 0.26 | CATALYST 1010 (Supplier: Cytec Ind. Inc.) toluene sulfonic acid catalyst |
| 11 | 0.17 | 2 AMP REGULAR (Supplier: Angus Chemical Co.) 2-amino-2-methyl-1-propanol stabilizer |
| 12 | 0.16 | BALAB 760 (Witco Chemical Corp.) defoamer |
| 13 | 1.83 | CERAMIC SIL 42-18 (Supplier: Silbrco Corp.) 1–210 micron-size expanded perlite insulative agent |
| 14 | 2.50 | SOLVESSO #150 (as above) |

Therewith, the water-based, insulative paint is made, adding all component items in sequence, as follows:

Add the first two items (Nos. 1 & 2) to mixing tank under agitation, and with Cowles dissolver set at high speed (1000–2000 rotations per minute (rpm)), mix until a 7.5 Hegman grind is attained. During the dispersion phase, and for all subsequent additions, the height and/or speed of the dissolver blade should be adjusted to avoid excessive air being sucked into the batch resulting from too deep a vortex or too high a speed.

Add the next three items (Nos. 3, 4 & 5) with mixing.

Add the next item (No. 6) and mix until smooth. Check grind gauge to insure that the batch is free from any large particles.

Add the next two items (Nos. 7 & 8) with mixing.

In a separate container, pre-mix the next three items (Nos. 9, 10 & 11). Slowly add this three-item mixture to the batch with agitation.

Add the next item (No. 12) with mixing.

With continued mixing at the high speed, add the next item (No. 13) very slowly to the vortex of the batch. Add it in increments at a rate such that the expanded perlite goes into the batch and does not float on the surface. When all of the 13th item is added, scrape down the sides of the vessel, and allow the batch to mix until all large agglomerates are dispersed.

Finally, add the last item (Nos. 14). Mix for 5 minutes.

The dissolver is then turned off. A sample can be drawn from the batch for quality control testing.

The sample is allowed to age at least 16 hours before running quality control tests. The following properties are observed:

Viscosity: 38–42 seconds on #4 Zahn cup at 75 degrees F. (24 degrees C.).

Film: Coating is applied to 16 and 24 gauge galvanized steel panels, over a corrosion resistant acrylic emulsion primer, to a dry film thickness of 1.2 to 2.0 mils. For lab tests, uniformity in film thickness is achieved by spraying rather than using a #26 draw down wire. Bake coating for 45 seconds at 550–560 degrees F. (288–293 degrees C.) in a circulating oven to achieve a Panel Metal Temperature (P.M.T.) of 450 degrees F. (232 degrees C.). After removing the panels from the oven, immediately quench with cold water, and then allow the panels to stabilize at room temperature for 15–20 minutes. The following is observed:

1. Color: Straight untinted white.
2. Hardness: Passes F to 2H pencil hardness.
3. Flexibility: Passes a 1-T bend. Using the SCOTCH tape test, no coating is removed at the bend when the tape is removed.
4. Solvent resistance: Coating withstands a minimum of 75 double rubs with a rag soaked in methyl ethyl ketone before coating is removed down to substrate.

The batch is drawn. It makes an excellent thermal paint.

The present invention is thus provided. Numerous adaptations can be effected by those skilled in the art within the spirit of the invention.

What is claimed is:

1. An organic solvent-based, insulative paint comprising a mixture prepared by serially mixing together the following components:

A) About 40 to 60 parts by weight of a silicone modified polyester film forming agent;

B) About 10 to 30 parts by weight of a pigment having a refractive index of at least about 1.5, and about 2 to 15 parts by weight of an extender;

C) About 8 to 35 parts by weight of an organic solvent containing an aromatic part and an aliphatic hydroxylated part;

D) About 1.2 to 8 parts by weight of a melamine/melamine-formaldehyde cross-linker/leveling agent;

E) About 0.5 to 3 parts by weight of a 1–210 micron sized perlitic insulative agent;

F) About 0.1 to 1 parts by weight of a catalytic organic acid;

G) About 0.1 to 0.5 parts by weight of a stabilizer of an amino alcohol; and

H) About 0.1 to 0.5 parts by weight of a defoaming agent.

2. The paint of claim 1, wherein the perlitic insulative agent is expanded perlite.

3. The paint of claim 1, wherein the high refractive index pigment is titanium dioxide, and the extender is aluminum silicate; the aromatic part of the organic solvent contains a substantial amount of predominately nine to eleven carbon aromatic hydrocarbons, to include alkyl benzenes, with a boiling range about from 185 to 204 degrees C., and the aliphatic hydroxylated part of the organic solvent contains 2-butoxyethanol and 1-butanol; the melamine/melamine-formaldehyde cross-linker/leveling agent includes hexamethoxymethylmelamine having a degree of polymerization of about 1.7 and a butylated melamine having a degree of polymerization about from 8 to 12; the perlitic insulative agent is expanded perlite; and the stabilizer of an amino alcohol is 2-amino-2-methyl-1-propanol.

4. The paint of claim 3, wherein generally, the film forming agent is present in an amount about from 45 to 55 parts by weight (pbw); the titanium dioxide is present in an amount about from 15 to 25 pbw, and the aluminum silicate is present in an amount about from 7 to 10 pbw; the aromatic part of the organic solvent is present in an amount about from 7 to 12 pbw, and the aliphatic hydroxylated part of the organic solvent is present in an amount about from 4 to 10 pbw; the hexamethoxymethylene is present in an amount about from 2 to 4 pbw, and the butylated melamine is present in an amount about from 0.4 to 1.4 pbw; the expanded perlite is present in an amount about from 5 to 3 pbw; the toluene sulfonic acid is present in an amount about from 0.2 to 0.5 pbw; the 2-amino-2-methyl-1-propanol is present in an amount about from 0.1 to 0.3 pbw; and the defoaming agent is present in an amount about from 0.1 to 0.3 pbw.

5. A method of making an organic solvent-based, insulative paint, which method comprises serially carrying out the following steps:

A) Mixing together a minor amount of a silicone modified polyester film forming agent and a high refractive index pigment, which is a pigment having a refractive index of at least about 1.5, to provide a first intermediate mixture;

B) Adding to the first intermediate mixture and mixing together a major amount of a silicone modified polyester film forming agent and at least one melamine/melamine-formaldehyde cross-linker/leveling agent to provide a second intermediate mixture;

C) Add to the second intermediate mixture and mixing an extender to provide a third intermediate mixture;

D) Adding to the third intermediate mixture a major amount of organic solvent containing an aromatic part and an organic hydroxylated part to provide a fourth intermediate mixture;

E) Adding to the fourth intermediate mixture with mixing a separate, pre-mixed mixture of a minor amount of organic solvent containing an organic hydroxylated part, catalytic organic acid, and a stabilizer of an amino alcohol to provide a fifth intermediate mixture;

F) Adding to the fifth intermediate mixture and mixing a defoamer to provide a sixth intermediate mixture;

G) Adding to the sixth intermediate mixture with further mixing to at least substantial uniformity a 1–210 micron sized perlitic insulative agent 0.5 to 3 parts by weight, to provide a seventh intermediate mixture, and H) Adding to the seventh intermediate mixture a minor amount of organic solvent containing an aromatic part, and mixing to provide said paint.

6. An article of manufacture comprising a substrate having attached thereto a residue of the paint of claim 1.

7. The article of claim 6, wherein the substrate is metal.

8. The article of claim 7, wherein an undercoat is present.

9. The article of claim 8, wherein the metal is steel.

* * * * *